United States Patent
Wen et al.

(10) Patent No.: US 11,316,737 B2
(45) Date of Patent: Apr. 26, 2022

(54) METHOD AND SYSTEM FOR SERVICE SOFTWARE UPGRADE IN AN EVOLVED PACKET CORE (EPC) SYSTEM

(71) Applicant: HUAWEI TECHNOLOGIES CO., LTD., Shenzhen (CN)

(72) Inventors: Shicheng Wen, Mexico City (MX); Shaoji Ni, Helsinki (FI); Jidong Zhang, Shanghai (CN); Mingsen Tao, Shanghai (CN); Yang Shen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 16/927,866

(22) Filed: Jul. 13, 2020

(65) Prior Publication Data

US 2020/0344117 A1   Oct. 29, 2020

Related U.S. Application Data

(63) Continuation of application No. PCT/CN2019/071670, filed on Jan. 14, 2019.

(30) Foreign Application Priority Data

Jan. 15, 2018 (CN) .......................... 201810037190.2

(51) Int. Cl.
*H04L 12/24* (2006.01)
*H04L 41/082* (2022.01)
(Continued)

(52) U.S. Cl.
CPC ........... *H04L 41/082* (2013.01); *H04W 8/183* (2013.01); *H04W 28/0215* (2013.01); *H04W 72/042* (2013.01)

(58) Field of Classification Search
CPC ... H04L 41/082; H04L 45/02; H04L 47/2483; H04L 67/28; H04L 41/0863;
(Continued)

(56) References Cited

U.S. PATENT DOCUMENTS

| 8,606,765 B2 | 12/2013 | Boggs et al. |
| 2004/0031030 A1* | 2/2004 | Kidder ...................... G06F 1/14 717/172 |

(Continued)

FOREIGN PATENT DOCUMENTS

| CN | 1230090 A | 9/1999 |
| CN | 101739263 A | 6/2010 |

(Continued)

OTHER PUBLICATIONS

3GPP TS 23.203, V15.1. 0,: "3rd Generation Partnership Project; Technical Specification Group Services and System Aspects; Policy and charging control architecture (Release 15)", Dec. 22, 2017 (Dec. 22, 2017), pp. 1-261, XP051392081.

*Primary Examiner* — Mewale A Ambaye
(74) *Attorney, Agent, or Firm* — Stein IP, LLC (57) ABSTRACT

A software upgrade method and system which relate to the field of communications technologies. The method is applied to an evolved core packet (EPC) system. The EPC system includes a system manager, a traffic decider, a first service server, and a second service server, and the first service server and the second service server are installed with service software of a first version. As a result, service continuity and stability of the EPC system are ensured.

10 Claims, 8 Drawing Sheets

(51) Int. Cl.
*H04W 8/18* (2009.01)
*H04W 28/02* (2009.01)
*H04W 72/04* (2009.01)

(58) Field of Classification Search
CPC .... H04L 47/125; H04L 67/004; H04W 8/183; H04W 28/0215; H04W 72/042; H04W 12/12; H04W 72/048
See application file for complete search history.

(56) References Cited

U.S. PATENT DOCUMENTS

| | | | |
|---|---|---|---|
| 2005/0141550 A1 | 6/2005 | Mauger et al. | |
| 2005/0198247 A1* | 9/2005 | Perry | H04L 7/0008 709/223 |
| 2006/0190581 A1 | 8/2006 | Hagale et al. | |
| 2006/0224723 A1 | 10/2006 | Chen | |
| 2008/0072241 A1* | 3/2008 | Cohen | H04L 41/0893 719/317 |
| 2014/0229928 A1* | 8/2014 | Edstrom | G06F 8/656 717/171 |
| 2016/0294605 A1* | 10/2016 | Searle | H04L 41/082 |
| 2016/0294614 A1* | 10/2016 | Searle | H04L 67/34 |
| 2017/0086082 A1 | 3/2017 | Narayanan | |
| 2017/0346682 A1 | 11/2017 | Ni et al. | |
| 2018/0189046 A1* | 7/2018 | Kunisetty | H04L 41/082 |

FOREIGN PATENT DOCUMENTS

| | | |
|---|---|---|
| CN | 101888304 A | 11/2010 |
| CN | 102737088 A | 10/2012 |
| CN | 102937906 A | 2/2013 |
| CN | 106201561 A | 12/2016 |
| CN | 106657173 A | 5/2017 |
| JP | 2010183474 A | 8/2010 |
| JP | 2010251838 A | 11/2010 |
| JP | 2017528029 A | 9/2017 |
| WO | 2012123999 A1 | 9/2012 |
| WO | 2015103876 A1 | 7/2015 |
| WO | 2016131480 A1 | 8/2016 |

* cited by examiner

FIG. 9

METHOD AND SYSTEM FOR SERVICE SOFTWARE UPGRADE IN AN EVOLVED PACKET CORE (EPC) SYSTEM

CROSS-REFERENCE TO RELATED APPLICATIONS

This application a continuation of International Application No. PCT/CN2019/071670, filed on Jan. 14, 2019, which claims priority to Chinese Patent Application No. 201810037190.2, filed on Jan. 15, 2018, the disclosures of the aforementioned applications are hereby incorporated by reference in their entireties.

TECHNICAL FIELD

Aspects of this application relate to the field of communications technologies, and in particular, to a software upgrade method and a system.

BACKGROUND

An evolved packet core (EPC) system in a long term evolution (Long Term Evolution, LTE) architecture includes a plurality of types of network elements. The network elements communicate with each other by using an interface protocol, and mainly provide functions of processing and exchanging mobile voice and data. During distributed deployment of various network elements, each network element is usually deployed as a plurality of service servers installed with the same service software, and a traffic decider is disposed. In this way, the traffic decider may determine a specific service server to which a service is to be forwarded for processing.

When service software needs to be updated, a system manager in the EPC system controls all service servers to be disconnected from all user equipments, and then controls each service server to upgrade installed service software from a first version to a second version. After the service software in all the service servers is successfully upgraded, the traffic decider receives a service request sent by user equipment, and forwards the service request to an upgraded service server.

The service software of the second version cannot be verified by using service data on an existing network. Therefore, a potential vulnerability in the service software of the second version can be exposed only after the service software gets online, causing interruption of all services. In addition, after a service is interrupted, the service software in the service server further needs to be rolled back from the second version to the first version, and interruption of all services is also caused in the rollback process.

SUMMARY

To resolve problems that all services are interrupted due to a potential vulnerability in an upgrade process and all services are interrupted due to a rollback, aspects of this application provide a software upgrade method and a system.

According to a first aspect, a software upgrade method is provided. The method is applied to an EPC system, the EPC system includes a system manager, a traffic decider, a first service server, and a second service server, and the first service server and the second service server are installed with service software of a first version. The method includes: controlling, by the system manager, the second service server to upgrade the installed service software from the first version to a second version, controlling the traffic decider to set a service flow identifier included in a service data flow on the first service server to indicate the second service server, and controlling the first service server to transfer, to the second service server, the service data flow that includes the service flow identifier and that is on the first service server; receiving, by the traffic decider, a service data flow sent by user equipment, and forwarding the service data flow to the second service server based on a service flow identifier in the service data flow; and after the second service server becomes stable, controlling, by the system manager, the first service server to upgrade the installed service software from the first version to the second version.

The service software installed in the second service server that serves a small quantity of users is upgraded. In this way, even if a potential vulnerability in the service software of the second version is exposed, only services of the small quantity of users served by the upgraded second service server are interrupted, and services on the first service server that serves a large quantity of users are still run normally on the first service server. This can avoid a problem that all services are interrupted when a potential vulnerability is exposed after service software installed in all service servers is upgraded, and can also avoid a problem that all services are interrupted during a rollback, thereby ensuring service continuity. After the upgraded second service server becomes stable, remaining first service servers are gradually controlled to upgrade the installed service software. This may also be considered as verifying the service software by using service data on an existing network, thereby ensuring stability of the EPC system.

For some user equipments that do not get offline, a service data flow on the first service server is transferred to the upgraded second service server, instead of disconnecting the EPC system from the user equipments and reconnecting the user equipments to the EPC system. This can ensure service continuity and improve user experience.

A service flow identifier is used to indicate whether a service data flow is to be forwarded to the first service server or the upgraded second service server. This can avoid a problem of high signaling overheads caused when new signaling is specially set to transmit the service flow identifier, thereby reducing signaling overheads.

In a possible implementation solution, the method further includes: receiving, by the traffic decider, a service request sent by user equipment, and forwarding the service request to the second service server; allocating, by the second service server, a service flow identifier for the service request from the user equipment; and receiving, by the traffic decider, a service data flow sent by the user equipment, and forwarding the service data flow to the second service server based on the service flow identifier in the service data flow.

A service request sent by user equipment that is connected to the EPC system for the first time is forwarded to the upgraded second service server. This can avoid a problem that if the service request is forwarded to the first service server, a service data flow sent by the user equipment needs to be transferred to the upgraded second service server when the service software installed in the first service server needs to be upgraded subsequently, thereby simplifying a software upgrade scheme.

A service data flow sent by user equipment that is newly connected to the EPC system is forwarded to the upgraded second service server, and then a service data flow on the first service server is migrated. In this way, the service data flows are migrated in batches. This can avoid a problem that all services are interrupted when a potential vulnerability is exposed after all service data flows are migrated to the upgraded second service server at a time, and can also avoid a problem that all services are interrupted during a rollback. After the upgraded second service server becomes stable, service data flows forwarded to the upgraded second service server for processing are gradually increased, thereby ensuring stability of the EPC system.

In a possible implementation solution, the method further includes: obtaining, by the second service server, a value interval of the allocated service flow identifier, where value intervals of service flow identifiers of service software of different versions are different; and the allocating, by the second service server, a service flow identifier for the service request from the user equipment includes: selecting, by the second service server, a value from the value interval as the service flow identifier.

In a possible implementation solution, the method further includes: obtaining, by the traffic decider, attribute information of the user equipment; and when the attribute information indicates that the user equipment belongs to a preset user group, triggering execution of the step of forwarding the service request to the second service server; and when the attribute information indicates that the user equipment does not belong to a preset user group, forwarding the service request to the first service server.

When the preset user group is a friendly user group, the service software of the second version is used for trial among friendly users. In this way, even if a potential vulnerability in the service software of the second version is exposed and causes service interruption, the friendly users do not complain, to ensure credibility of the EPC system.

In a possible implementation solution, after the controlling, by the system manager, the second service server to upgrade the installed service software from the first version to a second version, the method further includes: after an exception occurs in the second service server, controlling, by the system manager, the second service server to roll back the installed service software from the second version to the first version.

First, when an exception in the second service server means that an exception occurs in service data flow processing, the second service server migrates a service data flow on the second service server to the first service server, and the system manager controls the second service server to roll back the installed service software from the second version to the first version.

Second, when an exception in the second service server means that the second service server breaks down, the system manager controls the second service server to roll back the installed service software from the second version to the first version.

Because only the second service server is controlled to roll back the service software to the first version, a rollback speed can be increased without causing an accident.

In a possible implementation solution, the service request includes a control-plane service request and a user-plane service request, and the service data flow includes a control-plane service data flow and a user-plane service data flow.

In a possible implementation solution, a control plane protocol includes a general packet radio service (GPRS) tunneling protocol-control plane GTP-C, a stream control transmission protocol (SCTP), a proxy mobile internet protocol (IP PMIP), an S1 interface application protocol (S1-AP), and a radio access network application part (RANAP); and a user plane protocol includes a GPRS tunneling protocol-user plane GTP-U or an IP.

According to a second aspect, an evolved packet core EPC system is provided. The EPC system includes a system manager, a traffic decider, a first service server, and a second service server, and the first service server and the second service server are installed with service software of a first version.

The system manager is configured to control the second service server to upgrade the installed service software from the first version to a second version, control the traffic decider to set a service flow identifier included in a service data flow on the first service server to indicate the second service server, and control the first service server to transfer, to the second service server, the service data flow that includes the service flow identifier and that is on the first service server; the traffic decider is further configured to receive a service data flow sent by user equipment, and forward the service data flow to the second service server based on a service flow identifier in the service data flow; and the system manager is further configured to: after the second service server becomes stable, control the first service server to upgrade the installed service software from the first version to the second version.

The service software installed in the second service server that serves a small quantity of users is upgraded. In this way, even if a potential vulnerability in the service software of the second version is exposed, only services of the small quantity of users served by the upgraded second service server are interrupted, and services on the first service server that serves a large quantity of users are still run normally on the first service server. This can avoid a problem that all services are interrupted when a potential vulnerability is exposed after service software installed in all service servers is upgraded, and can also avoid a problem that all services are interrupted during a rollback, thereby ensuring service continuity. After the upgraded second service server becomes stable, remaining first service servers are gradually controlled to upgrade the installed service software. This may also be considered as verifying the service software by using service data on an existing network, thereby ensuring stability of the EPC system.

For some user equipments that do not get offline, a service data flow on the first service server is transferred to the upgraded second service server, instead of disconnecting the EPC system from the user equipments and reconnecting the user equipments to the EPC system. This can ensure service continuity and improve user experience.

A service flow identifier is used to indicate whether a service data flow is to be forwarded to the first service server or the upgraded second service server. This can avoid a problem of high signaling overheads caused when new signaling is specially set to transmit a service flow identifier, thereby reducing signaling overheads.

In a possible implementation solution, the traffic decider is further configured to: obtain attribute information of the user equipment; and when the attribute information indicates that the user equipment belongs to a preset user group, trigger execution of the step of forwarding the service request to the second service server; and when the attribute information indicates that the user equipment does not belong to a preset user group, the traffic decider is further configured to forward the service request to the first service server.

The service software of the second version is used for trial among friendly users. In this way, even if a potential vulnerability in the service software of the second version is exposed and causes service interruption, the friendly users do not complain, to ensure credibility of the EPC system.

In a possible implementation solution, the second service server is further configured to obtain a value interval of the allocated service flow identifier, where value intervals of service flow identifiers of service software of different versions are different; and the second service server is further configured to select a value from the value interval as the service flow identifier.

In a possible implementation solution, the traffic decider is configured to receive a service request sent by user equipment, and forward the service request to the second service server; the second service server is configured to allocate a service flow identifier for the service request from the user equipment; and the traffic decider is further configured to receive a service data flow sent by the user equipment, forward the service data flow to the second service server based on the service flow identifier in the service data flow, and transfer, to the second service server, the service data flow that includes the service flow identifier and that is on the first service server.

A service request sent by user equipment that is connected to the EPC system for the first time is forwarded to the upgraded second service server. This can avoid a problem that if the service request is forwarded to the first service server, a service data flow sent by the user equipment needs to be transferred to the upgraded second service server when the service software installed in the first service server needs to be upgraded subsequently, thereby simplifying a software upgrade scheme.

A service data flow sent by user equipment that is newly connected to the EPC system is forwarded to the upgraded second service server, and then a service data flow on the first service server is migrated. In this way, the service data flows are migrated in batches. This can avoid a problem that all services are interrupted when a potential vulnerability is exposed after all service data flows are migrated to the upgraded second service server at a time, and can also avoid a problem that all services are interrupted during a rollback. After the upgraded second service server becomes stable, service data flows forwarded to the upgraded second service server for processing are gradually increased, thereby ensuring stability of the EPC system.

In a possible implementation solution, the second service server is further configured to obtain a value interval of the allocated service flow identifier, where value intervals of service flow identifiers of service software of different versions are different; and the second service server is further configured to select a value from the value interval as the service flow identifier.

In a possible implementation solution, the traffic decider is further configured to: obtain attribute information of the user equipment; and when the attribute information indicates that the user equipment belongs to a preset user group, trigger execution of the step of forwarding the service request to the second service server; and when the attribute information indicates that the user equipment does not belong to a preset user group, forward the service request to the first service server.

When the preset user group is a friendly user group, the service software of the second version is used for trial among friendly users. In this way, even if a potential vulnerability in the service software of the second version is exposed and causes service interruption, the friendly users do not complain, to ensure credibility of the EPC system.

In a possible implementation solution, the system manager is further configured to: after controlling the second service server to upgrade the installed service software from the first version to the second version, and if an exception occurs in the second service server, control the second service server to roll back the installed service software from the second version to the first version.

First, when an exception in the second service server means that an exception occurs in service data flow processing, the second service server is further configured to migrate a service data flow on the second service server to the first service server, and the system manager is further configured to control the second service server to roll back the installed service software from the second version to the first version.

Second, when an exception in the second service server means that the second service server breaks down, the system manager is further configured to control the second service server to roll back the installed service software from the second version to the first version.

Because only the second service server is controlled to roll back the service software to the first version, a rollback speed can be increased without causing an accident.

In a possible implementation solution, the service request includes a control-plane service request and a user-plane service request, and the service data flow includes a control-plane service data flow and a user-plane service data flow.

In a possible implementation solution, a control plane protocol includes a general packet radio service (GPRS) tunneling protocol-control plane GTP-C, a stream control transmission protocol (SCTP), a proxy mobile internet protocol (IP PMIP), an S1 interface application protocol S1-AP, and a radio access network application part (RANAP); and a user plane protocol includes a GPRS tunneling protocol-user plane protocol GTP-U or an IP.

DESCRIPTION OF EMBODIMENTS

To make the objectives, technical solutions, and advantages of this application clearer, the following further describes the implementations of this application in detail with reference to the accompanying drawings.

A "unit" mentioned in this specification refers to a functional structure obtained through logical division, and the "unit" can be implemented by hardware only or a combination of hardware and software.

Figure 1:
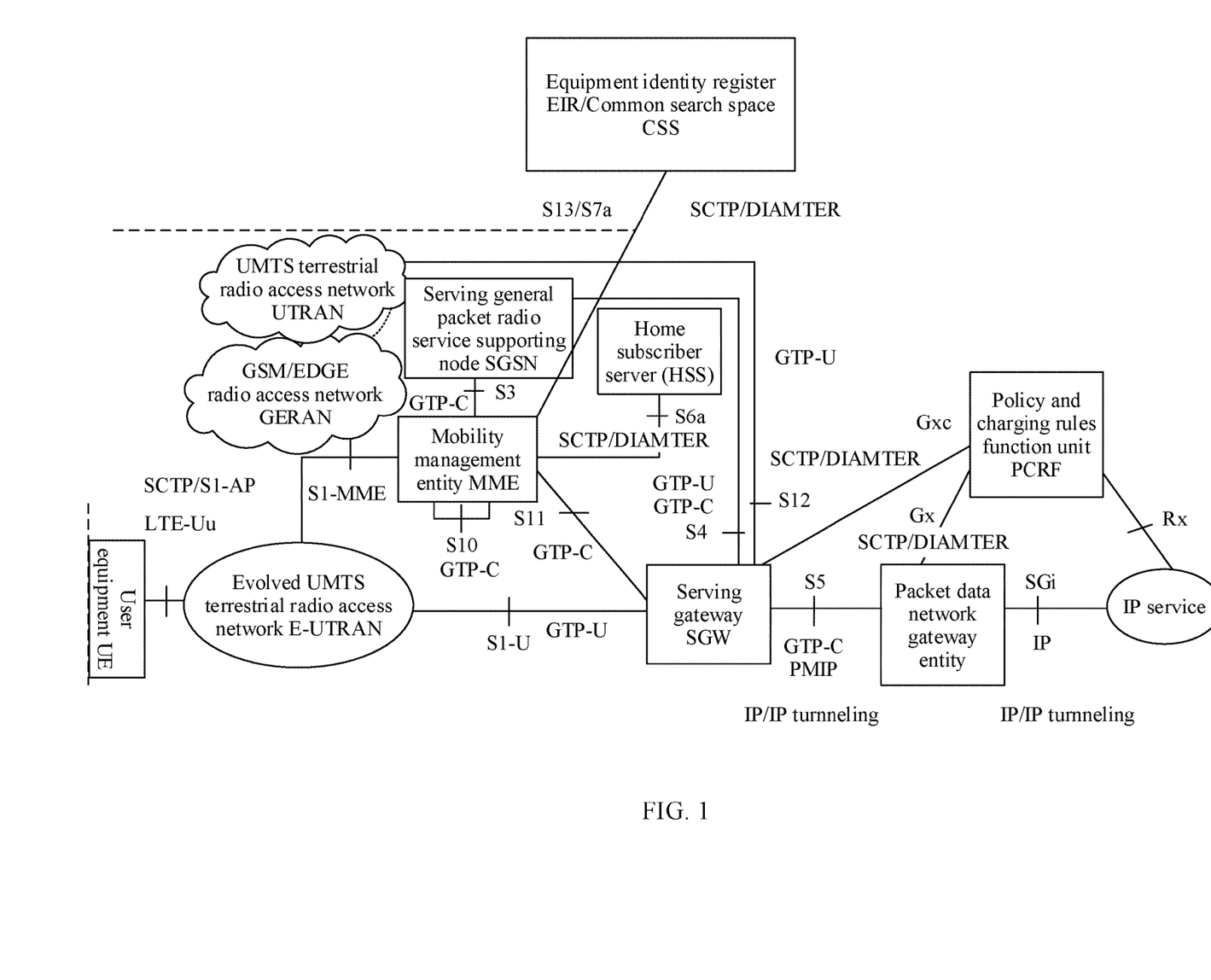
FIG. 1 is a schematic structural diagram of an LTE system according to an example embodiment of this application.

FIG. 1 is a schematic structural diagram of an LTE system 100 according to an example embodiment of this application. The LTE system 100 includes user equipment (UE), an evolved UMTS terrestrial radio access network (E-UTRAN), a UMTS terrestrial radio access network UTRAN), a GSM/EDGE radio access network (GERAN), an EPC system, and an internet protocol (IP) service. The EPC system includes the following network elements: a mobility management network entity (MME), a serving gateway (S-GW for short), a packet data network gateway entity (P-GW), a policy and charging rules function unit (PCRF), a home subscriber server (HSS), a serving general packet radio service supporting node (SGSN), an equipment identity register (EIR), and a common search space (CSS).

The E-UTRAN is configured to implement a function related to a radio evolved network. The MME is responsible for mobility management on a control plane, for example, user context and mobility status management and temporary user identity allocation. The S-GW is a user plane anchor between 3rd Generation Partner Project (3GPP) access networks. The P-GW is a user plane anchor between a 3GPP access network and a non-3GPP access network and is an interface of an external packet data network (PDN). The PCRF is configured to formulate a policy control rule and perform flow-based charging. The HSS is configured to store user subscription information. UE performs control-plane and user-plane interaction with a System Architecture Evolution (SAE) network through the E-UTRAN. The UTRAN and the GERAN are configured to implement all radio-related functions in an existing GPRS/UMTS network. The SGSN is configured to implement functions such as routing and forwarding, mobility management, session management, and user information storage in the GPRS/UMTS network.

The network elements communicate with each other by using protocols and interfaces. For details, refer to the interfaces and the protocols shown in FIG. 1. Control plane protocols include the GPRS tunneling protocol-control plane (GTP-C), the stream control transmission protocol (SCTP), the proxy mobile IP (PMIP), and the S1 interface application protocol (S1-AP), and the radio access network application part (RANAP). A user plane protocol includes the GPRS tunneling protocol-user plane (GTP-U) or the IP.

Communication between different network elements is implemented. In addition, each network element in the EPC system can be deployed as a plurality of service servers. All the service servers are installed with the same service software, to provide a same service for user equipment in different areas, thereby implementing distributed deployment. In this case, a system manager and a traffic decider are further disposed in the EPC system. The system manager is configured to control each network element in the EPC system, and the traffic decider is configured to determine a specific service server to which a service data flow obtained after a service request is sent is forwarded.

Figure 2:
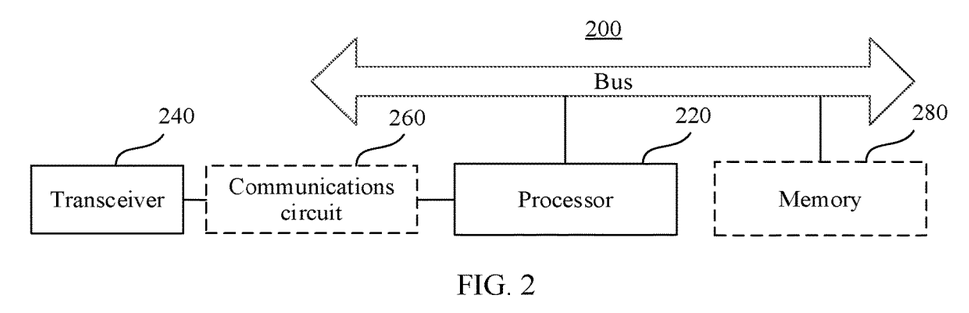
FIG. 2 is a schematic structural diagram of a network element according to an example embodiment of this application.

FIG. 2 is a schematic structural diagram of a network element 200 according to another example embodiment of this application. The network element 200 includes a processor 220 and a wireless transceiver 240 connected to the processor 220.

The wireless transceiver 240 may include one or more antennas, and the antenna enables the network element 200 to send or receive a radio signal.

The wireless transceiver 240 may be connected to a communications circuit 260. The communications circuit 260 may perform various processing on a signal received by the wireless transceiver 240 or sent by the wireless transceiver 240, for example, modulate a signal sent by the wireless transceiver 240 and demodulate a signal received by the wireless transceiver 240. During actual implementation, the communications circuit 260 may include a radio frequency (radio frequency, RF) chip and a baseband chip.

The communications circuit 260 may be connected to the processor 220. Alternatively, the communications circuit 260 may be integrated into the processor 220. The processor 220 is a control center of a network element. The processor 220 may be a central processing unit (CPU), a network processor (NP), or a combination of a CPU and an NP. The processor 220 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or a combination thereof. A memory 280 is connected to the processor 220 by using a bus or in another manner. The memory 280 may be a volatile memory, a non-volatile memory, or a combination thereof. The volatile memory may be a random-access memory (RAM), for example, a static random access memory (SRAM) or a dynamic random access memory (DRAM). The non-volatile memory may be a read-only memory (ROM), for example, a programmable read only memory (PROM), an erasable programmable read only memory (EPROM), or an electrically erasable programmable read-only memory (EEPROM). The non-volatile memory may alternatively be a flash memory or a magnetic memory, for example, a magnetic tape, a floppy disk, or a hard disk. The non-volatile memory may alternatively be a compact disc.

Figure 3:
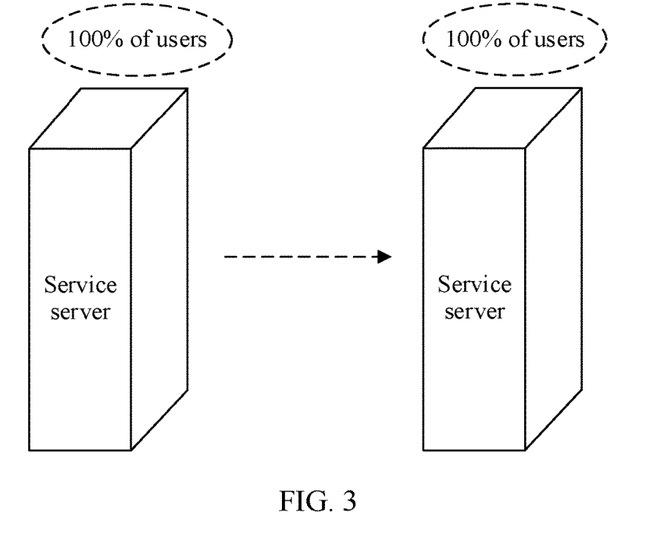
FIG. 3 is a schematic diagram of software upgrade in a related technology according to an example embodiment of this application.

Referring to FIG. 3, in a related technology, service data flows sent by all user equipments are all transferred to an upgraded service server at a time, leading to problems that all services are interrupted due to a potential vulnerability in an upgrade process and all services are interrupted due to a rollback. To resolve the foregoing and/or other problems, in this application, service servers are upgraded in batches, and then service data flows sent by user equipments are migrated to an upgraded service server in batches. For details, refer to descriptions in the following embodiments.

It should be noted that one network element device may include a plurality of service servers, and the service servers may be upgraded in batches according to a proportion. For example, service servers of a fixed proportion are upgraded each time, for example, 10%. Alternatively, a proportion of service servers in each upgrade is gradually increased. For example, a proportion of service servers in a first upgrade is 5%, and a proportion of service servers in a second upgrade is 10%. This is not limited in this embodiment. For ease of description, that only two service servers are upgraded is used as an example in the following embodiments. A service server that is upgraded first is referred to as a second service server, and a service server that is upgraded later is referred to as a first service server.

Figure 4:
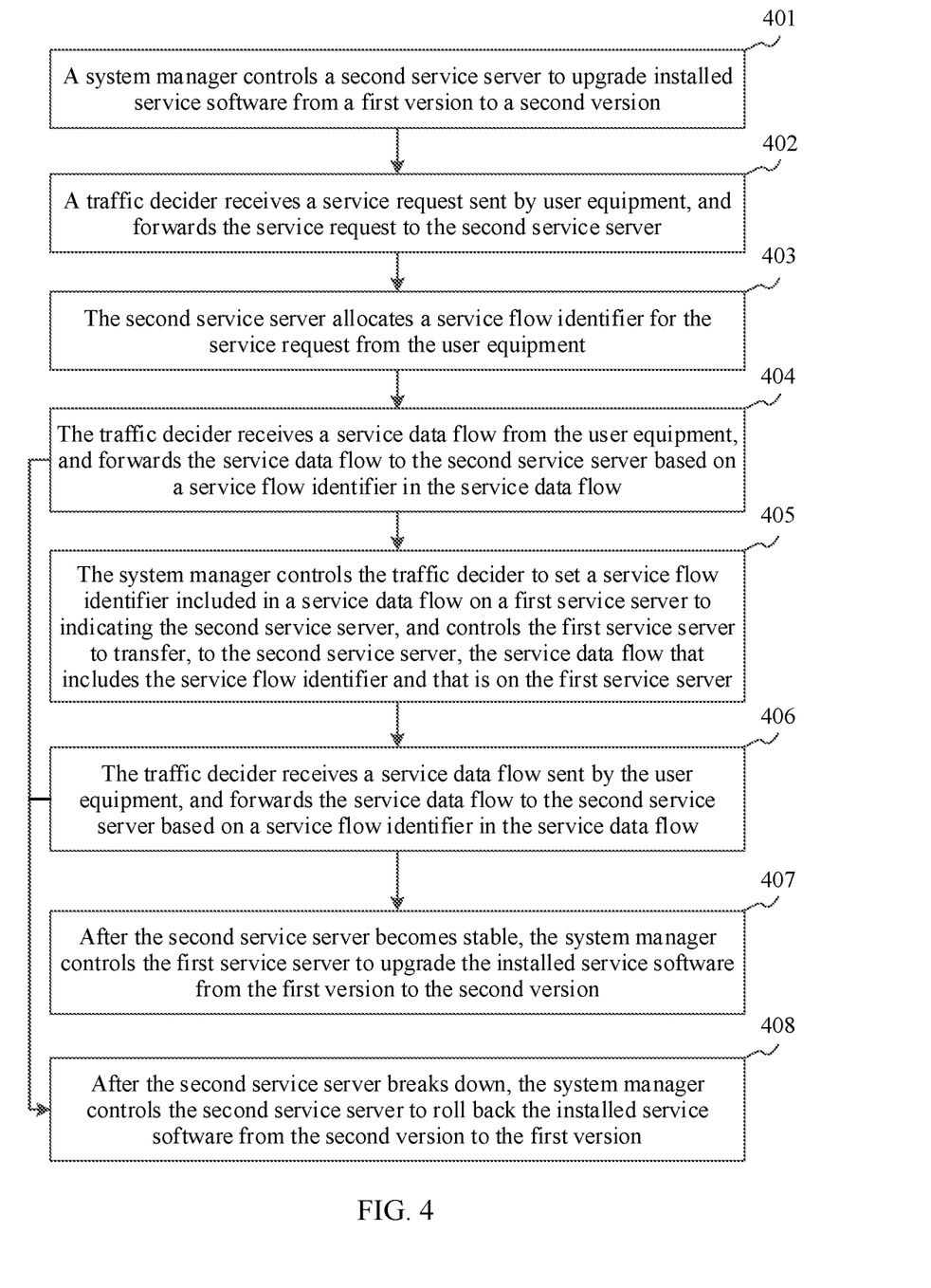
FIG. 4 is a flowchart of a software upgrade method according to an example embodiment of this application.

FIG. 4 is a flowchart of a software upgrade method according to an example embodiment of this application. In this embodiment, the method is applied to the EPC system shown in FIG. 1. In this embodiment, only one first service server and one second service server are used as an example for description. The method includes the following several steps.

Step 401. A system manager controls the second service server to upgrade installed service software from a first version to a second version.

In this embodiment, a version of service software before an upgrade is referred to as the first version, and a version of service software after the upgrade is referred to as the second version.

The system manager may randomly select one of the two service servers as the second service server, and directly control the second service server to upgrade the installed service software from the first version to the second version. However, when the second service server is processing a service data flow sent by user equipment, if the service software in the second service server needs to be upgraded, the EPC system needs to be disconnected from the user equipment to force the user equipment to get offline, affecting user experience. Therefore, in a possible implementation, the system manager may select a service server in an idle state as the second service server, and control the second service server to upgrade the installed service software from the first version to the second version. The service server being in an idle state means that the service server does not process a service data flow or process a small quantity of service data flows.

In an implementation, the system manager may send an upgrade instruction to the second service server. After receiving the upgrade instruction, the second service server obtains and installs the service software of the second version, and upgrades the service software from the first version to the second version. The second service server described below is a second service server whose installed service software is upgraded to the second version.

Step 402. A traffic decider receives a service request sent by user equipment, and forwards the service request to the second service server.

In this case, the user equipment is user equipment that is connected to the EPC system for the first time. For example, the user equipment may be user equipment that gets online again after getting offline. After the user equipment gets offline, a service data flow that is previously sent by the user equipment and that is forwarded by the traffic decider to the first service server is deleted.

After receiving the service request, the traffic decider parses the service request. When a result of the parsing is new user signaling or an initial service access request, the traffic decider determines that the user equipment is user equipment that is connected to the EPC system for the first time, and sends the service request to the second service server. The service request includes a control-plane service request and a user-plane service request. This can avoid a problem that if the service request is forwarded to the first service server, a service data flow sent by the user equipment needs to be transferred to the upgraded second service server when the service software installed in the first service server needs to be upgraded subsequently, thereby simplifying a software upgrade scheme.

Optionally, the traffic decider obtains attribute information of the user equipment; and when the attribute information indicates that the user equipment belongs to a preset user group, the traffic decider triggers execution of the step of forwarding the service request to the second service server; and when the attribute information indicates that the user equipment does not belong to a preset user group, the traffic decider forwards the service request to the first service server. In this case, when the preset user group is a friendly user group, the service software of the second version is used for trial among friendly users. In this way, even if a potential vulnerability in the service software of the second version is exposed and causes service interruption, the friendly users do not complain, to ensure credibility of the EPC system.

Figure 5:
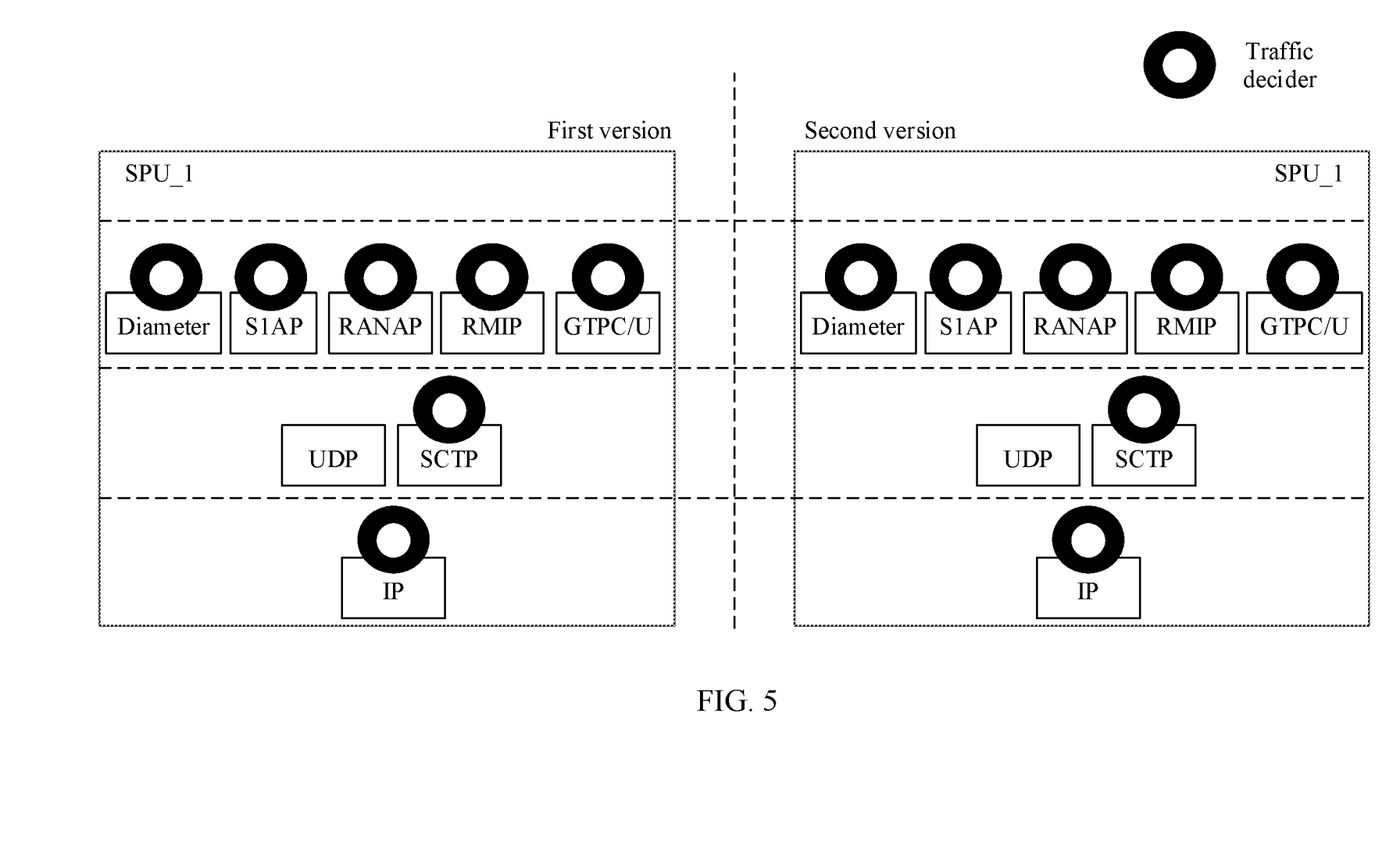
FIG. 5 is a schematic diagram of distribution of traffic deciders in protocol units according to an example embodiment of this application.

In this embodiment, the EPC system includes a logical traffic decider. The logical traffic decider may be deployed in a distributed manner. For example, the traffic decider is deployed on a load balancer and a protocol unit or in another location. Referring to FIG. 5, a traffic decider is represented by a circular ring in FIG. 5. To be specific, one traffic decider is disposed on each protocol unit.

Figure 6:
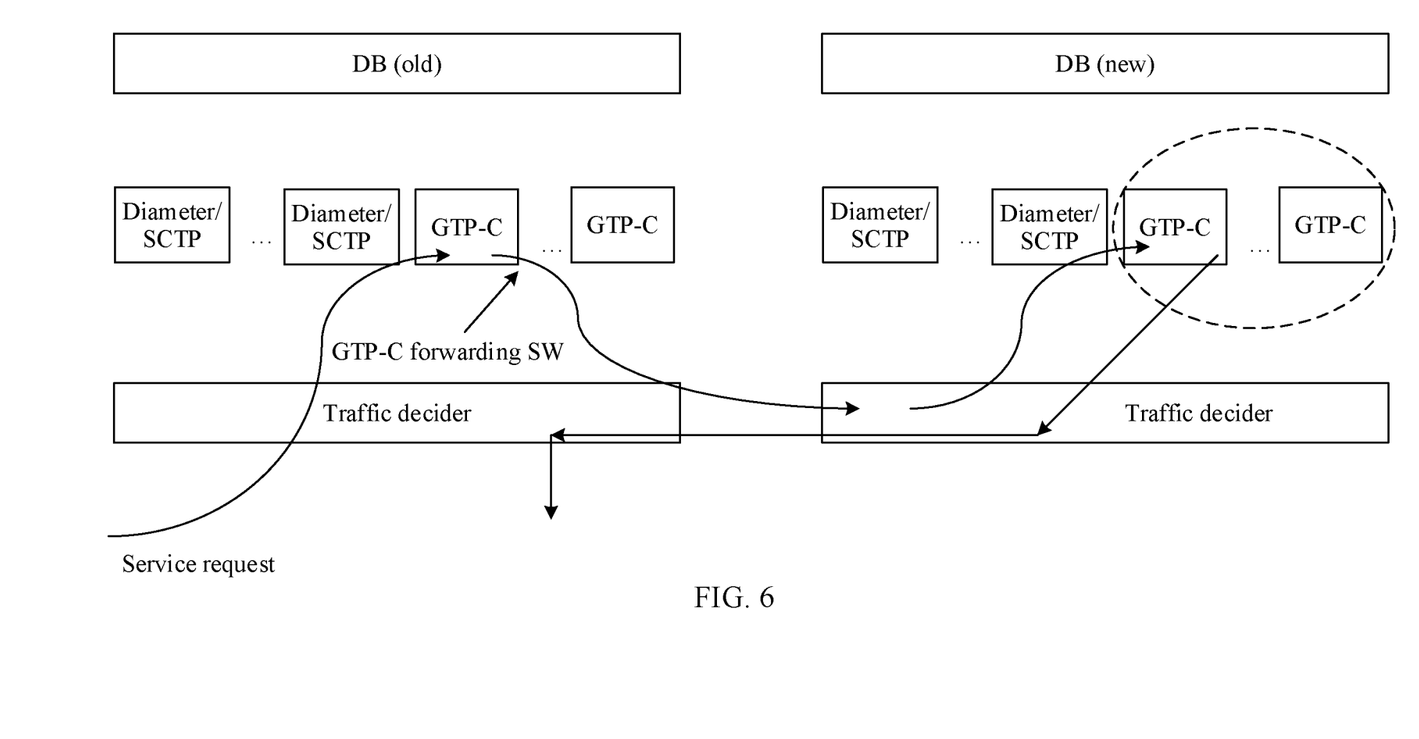
FIG. 6 is a schematic diagram of a processing path of a service request sent by user equipment according to an example embodiment of this application.

Referring to FIG. 6, an example in which the first service server is corresponding to an old traffic decider, the second service server is corresponding to a new traffic decider, and each protocol unit is corresponding to one traffic decider is used for description. A DB (old) is a database storing service software of a first version, and a DB (new) is a database storing service software of a second version. The traffic decider is a traffic decider, and each service server includes a diameter/SCTP protocol unit and a GTP-C protocol unit. After receiving a service request, the old traffic decider cannot parse the service request, and forwards the service request to a GTP-C protocol unit on the first service server. The GTP-C protocol unit learns, by parsing, that the service request is new user signaling or an initial service access request, determines that user equipment is connected to the EPC system for the first time, and forwards the service request to the new traffic decider by using a traffic decider of the GTP-C protocol unit. The new traffic decider forwards the service request to a GTP-C protocol unit on the second service server, and the GTP-C protocol unit sends a processing result to the new traffic decider. If there is only one data link, the new traffic decider sends the processing result to the old traffic decider, and the old traffic decider outputs the processing result. If there are a plurality of data links, the new traffic decider may output the processing result through another link. The foregoing processing process may be represented by using arrows in FIG. 6.

Step 403. The second service server allocates a service flow identifier for the service request from the user equipment.

The service flow identifier may be carried in a service data flow for transmission. This can avoid a problem of high signaling overheads caused when new signaling is specially set to transmit the service flow identifier, thereby reducing signaling overheads.

Before allocating the service flow identifier for the service request from the user equipment, the second service server obtains a value interval of the allocated service flow identifier. Value intervals of service flow identifiers of service software of different versions are different. The service flow identifier herein may also be referred to as a protocol identifier.

In this case, the second service server selects a value from the value interval as the service flow identifier.

The following describes the service flow identifier. Service flow identifiers of the GTP-C and the GTP-U are TEIDs; a service flow identifier of the PMIP is an MNNAI; a service flow identifier of the SCTP is a quintuple or vTag; a service flow identifier of the IP (Diameter) is a quintuple; a service flow identifier of the S1-AP is an S1-AP ID; and a service flow identifier of the RANAP is an RANAP ID.

The value interval of the service flow identifier may be allocated by the system manager to the second service server, or may be preconfigured. This is not limited in this embodiment.

In this embodiment, the traffic decider further needs to be notified of the value interval of the service flow identifier corresponding to the second service server. Because the first service server stores a value interval of a service flow identifier corresponding to the first service server, and value intervals of service flow identifiers of service software of different versions are different, the service flow identifier allocated by the second service server for the service request from the user equipment is definitely different from a service flow identifier allocated by the first service server for the service request from the user equipment. The traffic decider may determine, based on a service flow identifier, whether to forward a service data flow to the first service server or the second service server.

Step 404. The traffic decider receives a service data flow from the user equipment, and forwards the service data flow to the second service server based on the service flow identifier in the service data flow.

In this case, the user equipment is connected to the EPC system not for the first time, and a previously sent service request is forwarded to the user equipment served by the second service server.

The service data flow includes a control-plane service data flow and a user-plane service data flow.

A context of new user registration data or a new control plane packet is generated on the second service server by using the control-plane service data flow, and a context of new user registration data or a new user plane packet is generated on the second service server by using the user-plane service data flow.

Figure 7:
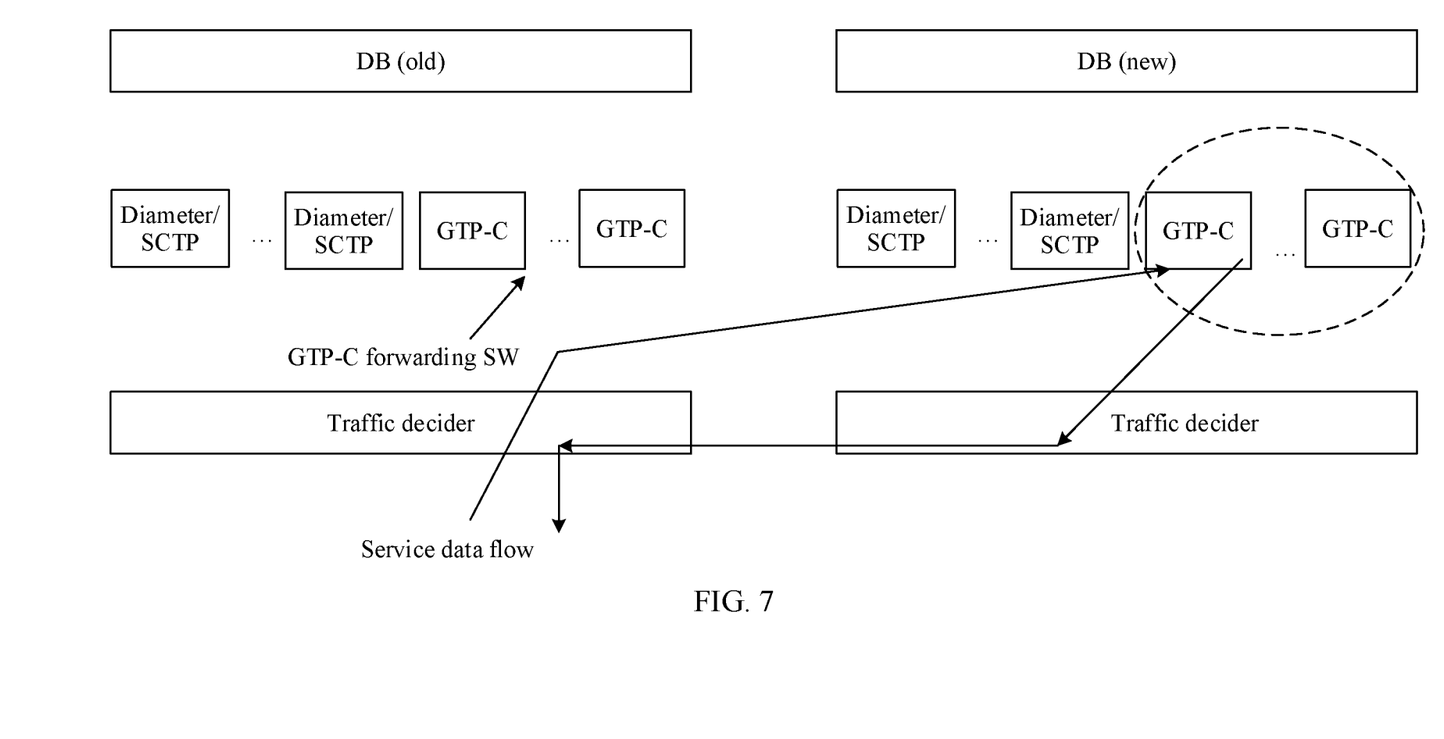
FIG. 7 is a schematic diagram of a processing path of a service data flow sent by user equipment according to an example embodiment of this application.

Refer to FIG. 7. FIG. 7 is different from FIG. 6 in that a service data flow is received. An old traffic decider may identify a service flow identifier, and determine, based on the service flow identifier, to forward the service data flow to a GTP-C protocol unit in the second service server. The GTP-C protocol unit sends a processing result to a new traffic decider. If there is only one data link, the new traffic decider sends the processing result to the old traffic decider, and the old traffic decider outputs the processing result. If there are a plurality of data links, the new traffic decider may output the processing result through another link. The foregoing processing process may be represented by using arrows in FIG. 7.

Steps 402 to 404 provide a processing manner corresponding to user equipment that gets online again after getting offline from the EPC system. For some user equipments that do not get offline, the EPC system may be disconnected forcibly from these user equipments, to force these user equipments to get offline. However, this causes service interruption and affects user experience. Therefore, migration of a service data flow may be implemented by using steps 405 and 406. A sequence of performing steps 402 to 404 and performing steps 405 and 406 is not limited in this embodiment.

Step 405. The system manager controls the traffic decider to set a service flow identifier included in a service data flow on the first service server to indicate the second service server, and controls the first service server to transfer, to the second service server, the service data flow that includes the service flow identifier and that is on the first service server.

Transferring the service data flow means transferring a context of a control plane packet and a context of a user plane packet on the first service server to the second service server. Optionally, the transferred context may further be converted, so that the context is applicable to the second service server.

For some user equipments that do not get offline, a service data flow on the first service server is transferred to the second service server, instead of disconnecting the EPC system from the user equipments and reconnecting the user equipments to the EPC system. This can ensure service continuity and improve user experience.

Step 406. The traffic decider receives a service data flow sent by the user equipment, and forwards the service data flow to the second service server based on the service flow identifier in the service data flow.

In this case, the user equipment is user equipment sending the service data flow that is subsequently transferred from the first service server to the second service server.

Figure 8:
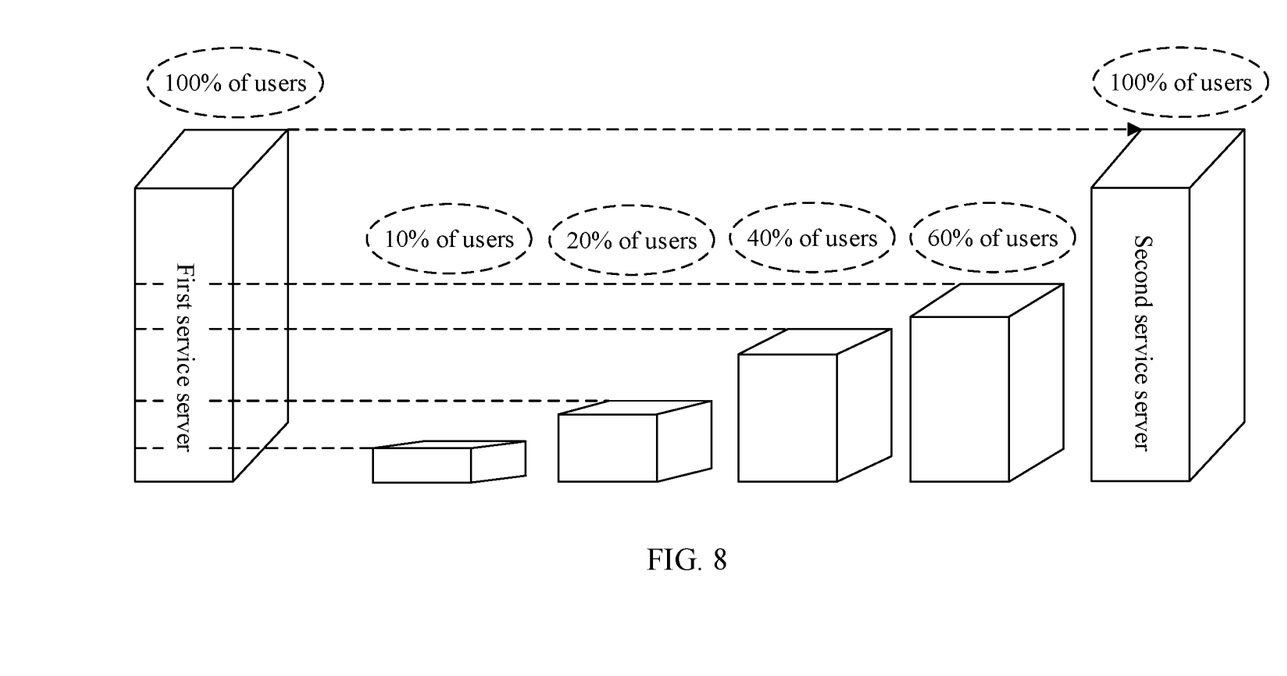
FIG. 8 is a schematic diagram of software upgrade in this application according to an example embodiment of this application.

Optionally, steps 405 and 406 may be further performed for a plurality of times, to transfer service data flows on the first service server to the second service server in batches. Referring to FIG. 8, service data flows are transferred in five batches. For example, service data flows of 10% of users are transferred in a first batch, service data flows of 20% of the users are transferred in a second batch, service data flows of 40% of the users are transferred in a third batch, service data flows of 60% of the users are transferred in a fourth batch, and service data flows of 100% of the users are transferred in a fifth batch.

A service data flow sent by user equipment that is newly connected to the EPC system is forwarded to the second service server, and then a service data flow on the first service server is migrated. In this way, the service data flows are migrated in batches. This can avoid a problem that all services are interrupted when a potential vulnerability is exposed after all service data flows are migrated to the second service server at a time, and can also avoid a problem that all services are interrupted during a rollback.

Step 407. After the second service server becomes stable, the system manager controls the first service server to upgrade installed service software from the first version to the second version.

That the second service server becomes stable means that indicators on the second service server are normal and stable in a process of processing the service request and the service data flow.

After the second service server becomes stable, the system manager may directly control the first service server to upgrade the installed service software from the first version to the second version. However, when the first service server is processing a service data flow sent by user equipment, if the service software in the first service server needs to be upgraded, the EPC system needs to be disconnected from the user equipment to force the user equipment to get offline, affecting user experience. Therefore, in a possible implementation, after all service data flows on the first service server are transferred or deleted, that is, they are in an idle state, the system manager may control the first service server to upgrade the installed service software from the first version to the second version.

The upgrade process of the service software installed in the first service server is the same as that of the service software installed in the second service server. For details, refer to the description in step 401. Details are not described herein again.

Step 408. After an exception occurs in the second service server, the system manager controls the second service server to roll back the installed service software from the second version to the first version.

After the second service server breaks down because a potential vulnerability in the service software of the second version is exposed, when an exception in the second service server means that an exception occurs in service data flow processing, the service data flow may be further migrated. In this case, the second service server migrates the service data flow in the second service server to the first service server, and the system manager controls the second service server to roll back the installed service software from the second version to the first version. When an exception in the second service server means that the second service server breaks down, a service data flow cannot be migrated. In this case, user equipment served by the second service server is disconnected from the EPC system, that is, the user equipment gets offline. When the user equipment is reconnected to the EPC system, a service request and a service data flow that are sent by the user equipment are forwarded by the traffic decider to the first service server.

Because only the second service server is controlled to roll back the service software to the first version, a rollback speed can be increased without causing an accident.

In conclusion, according to the software upgrade method provided in this embodiment of this application, the service software installed in the second service server that serves a small quantity of users is upgraded. In this way, even if a potential vulnerability in the service software of the second version is exposed, only services on the upgraded second service server are interrupted, and services on the first service server that serves a large quantity of users are still run normally on the first service server. This can avoid a problem that all services are interrupted when a potential vulnerability is exposed after service software installed in all service servers is upgraded, and can also avoid a problem that all services are interrupted during a rollback, thereby ensuring service continuity. After the upgraded second service server becomes stable, remaining first service servers are gradually controlled to upgrade the installed service software. This may also be considered as verifying the service software by using service data on an existing network, thereby ensuring stability of the EPC system.

For some user equipments that do not get offline, a service data flow on the first service server is transferred to the upgraded second service server, instead of disconnecting the EPC system from the user equipments and reconnecting the user equipments to the EPC system. This can ensure service continuity and improve user experience.

A service request sent by user equipment that is connected to the EPC system for the first time is forwarded to the upgraded second service server. This can avoid a problem that if the service request is forwarded to the first service server, a service data flow sent by the user equipment needs to be transferred to the upgraded second service server when the service software installed in the first service server needs to be upgraded subsequently, thereby simplifying a software upgrade scheme.

A service flow identifier is used to indicate whether a service data flow is to be forwarded to the first service server or the upgraded second service server. This can avoid a problem of high signaling overheads caused when new signaling is specially set to transmit a service flow identifier, thereby reducing signaling overheads.

The service software of the second version is used for trial among friendly users. In this way, even if a potential vulnerability in the service software of the second version is exposed and causes service interruption, the friendly users do not complain, to ensure credibility of the EPC system.

A service data flow sent by user equipment that is newly connected to the EPC system is forwarded to the upgraded second service server, and then a service data flow on the first service server is migrated. In this way, the service data flows are migrated in batches. This can avoid a problem that all services are interrupted when a potential vulnerability is exposed after all service data flows are migrated to the upgraded second service server at a time, and can also avoid a problem that all services are interrupted during a rollback. After the upgraded second service server becomes stable, service data flows forwarded to the upgraded second service server for processing are gradually increased, thereby ensuring stability of the EPC system.

Figure 9:
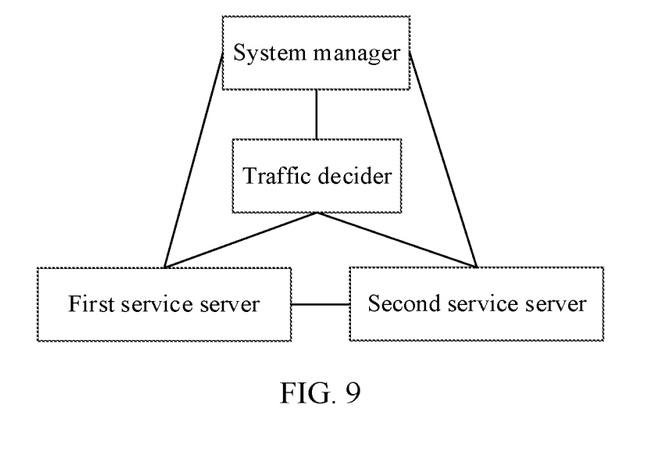
FIG. 9 is a structural diagram of a software upgrade apparatus according to an example embodiment of this application.

Because only the second service server is controlled to roll back the service software to the first version, a rollback speed can be increased without causing an accident. FIG. 9 is a block diagram of an EPC system according to an embodiment of this application. The EPC system may include a system manager, a traffic decider, a first service server, and a second service server.

The system manager is configured to implement the functions of steps 401, 405, 407, and 408.

The traffic decider is configured to implement the functions of steps 402 and 404, the function of setting the service flow identifier in step 405, and the function of step 406.

The first service server is configured to implement the function of migrating the service data flow in step 405 and the software upgrade function in step 407.

The second service server is configured to implement the software upgrade function in step 401, the function of step 403, and the software rollback function in step 408.

For related details, refer to the method embodiment in FIG. 4.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions.

A person skilled in the art may clearly understand that, for the purpose of convenient and brief description, for detailed working processes of the foregoing system, apparatus, and unit, refer to corresponding processes in the foregoing method embodiments, and details are not described herein again.

In the embodiments provided in the present application, it should be understood that the disclosed apparatus and method may be implemented in other manners. For example, the described apparatus embodiments are merely examples. For example, the unit division may merely be logical function division and may be division in another manner during actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to communication system, wherein the communication system comprises a system manager, a traffic decider, a first service server, and a second service server, and wherein the first service server and the second service server are installed with service software of a first version, the method comprising:
controlling, by the system manager, the second service server to upgrade the installed service software from the first version to a second version, controlling the traffic decider to set a first service flow identifier comprised in a service data flow of a user equipment on the first service server to indicate the second service server, and controlling the first service server to transfer, to the second service server, the service data flow that comprises the first service flow identifier and that is on the first service server;
receiving, by the traffic decider, a service data flow sent by the user equipment, and forwarding the service data flow to the second service server based on the first service flow identifier in the service data flow; and
after the second service server becomes stable, controlling, by the system manager, the first service server to upgrade the installed service software from the first version to the second version.

2. The method according to claim 1, further comprising:
receiving, by the traffic decider, a service request sent by a first user equipment connected to the communication system for the first time, and forwarding the service request to the second service server;
allocating, by the second service server, a second service flow identifier for the service request from the first user equipment; and
receiving, by the traffic decider, the service data flow sent by the first user equipment, and forwarding the service data flow to the second service server based on the second service flow identifier in the service data flow.

3. The method according to claim 2, further comprising:
obtaining, by the second service server, a value interval of a service flow identifier, wherein value intervals of service flow identifiers of service software of different versions are different;
wherein the allocating, by the second service server, the second service flow identifier for the service request from the first user equipment comprises: selecting, by the second service server, a value from the value interval as the second service flow identifier.

4. The method according to claim 2, wherein before the forwarding the service request to the second service server, the method further comprises:
obtaining, by the traffic decider, attribute information of the first user equipment; and
when the attribute information indicates that the first user equipment belongs to a preset user group, triggering execution of the step of forwarding the service request to the second service server; and
when the attribute information indicates that the first user equipment does not belong to a preset user group, forwarding the service request to the first service server.

5. The method according to claim 1, wherein after the controlling, by the system manager, the second service server to upgrade the installed service software from the first version to the second version, the method further comprises:
after an exception occurs in the second service server, controlling, by the system manager, the second service server to roll back the installed service software from the second version to the first version.

6. The method according to claim 2, wherein the service request comprises a control-plane service request and a user-plane service request, and the service data flow comprises a control-plane service data flow and a user-plane service data flow.

7. A system, comprising:
a first service server and a second service server; wherein the first and second service servers each comprise a wireless transceiver connected to a processor, and memory, wherein in the memory of the first service server and second service server contain a service software of a first version
a traffic decider, comprising a transceiver, a memory and a processor, wherein the processor of the traffic decider is configured to execute the instructions stored on the memory of the traffic decider, and the memory of the traffic decider stores instructions for receiving a service data flow sent by a user equipment, and forward the service data flow, via the transceiver of the traffic controller to the second service server based on a first service flow identifier in the service data flow;
a system manager, in electronic communication with the first service server and the second service server, and comprising a transceiver, a memory and a processor, wherein the processor of the system manager is configured to execute the instructions stored to the memory of the system manager the memory of the system manager stores instructions for controlling the second service server to upgrade the installed service software stored on the memory of the second service server from the first version to a second version, controlling the traffic decider to set the first service flow identifier comprised in a service data flow of the user equipment on the first service server to indicate the second service server, controlling the first service server to transfer, to the second service server, the service data flow that comprises the first service flow identifier and that is on the first service server, and controlling the first service server to upgrade the installed service software from the first version to the second version when the second service server becomes stable.

8. The system according to claim 7, wherein
the memory of the traffic decider further stores instructions to receive a service request, via the transceiver of the traffic decider sent by a first user equipment connected to a communication system for the first time, and forward, via the transceiver of the traffic decider the service request to the second service server, and receive the service data flow sent by the first user equipment, and forward the service data flow to the second service server based on the second service flow identifier in the service data flow;
the memory of the second service server further stores instructions to allocate a second service flow identifier for the service request from the first user equipment.

9. The system according to claim 8, wherein
the memory of the second service server further stores instructions to obtain a value interval of a service flow identifier, wherein value intervals of service flow identifiers of service software of different versions are different, and to select a value from the value interval as the second service flow identifier.

10. The system according to claim 8, wherein the service request comprises a control-plane service request and a user-plane service request, and the service data flow comprises a control-plane service data flow and a user-plane service data flow.

\* \* \* \* \*